Nov. 5, 1968  R. PAGAZANI ET AL  3,408,938
AIRBORNE TRIGGERING SYSTEM
Filed Dec. 28, 1966  5 Sheets-Sheet 1

Roger Pagazani
Marcel Palazo
INVENTORS.

BY

Karl F. Ross
Attorney

INVENTORS:
Roger Pagazani
Marcel Palazo

BY

Karl G. Ross
Attorney

Roger Pagazani
Marcel Palazo
INVENTORS.

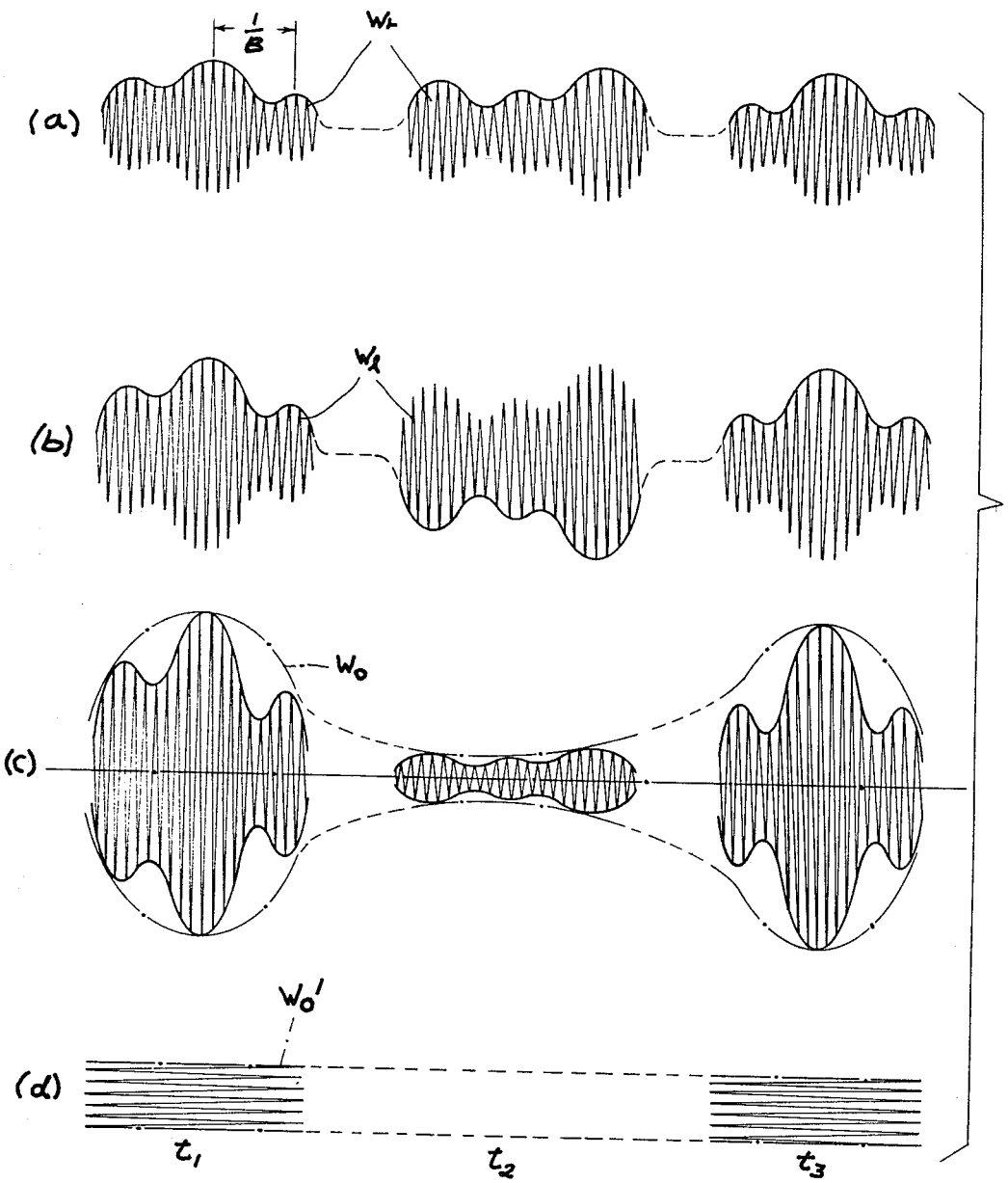

United States Patent Office 3,408,938
Patented Nov. 5, 1968

3,408,938
AIRBORNE TRIGGERING SYSTEM
Roger Pagazani, Fontenay-aux-Roses, and Marcel Palazo, Bourg-la-Reine, France, assignors to Compagnie Française Thomson-Houston-Hotchkiss Brandt
Filed Dec. 28, 1966, Ser. No. 605,291
Claims priority, application France, Dec. 30, 1965, 44,316
10 Claims. (Cl. 102—70.2)

ABSTRACT OF THE DISCLOSURE

The invention relates to an airborne triggering system with at least one transmitting antenna and one or more receiving antennas aboard a missile or other vehicle, operating on a continuous high-frequency carrier modulated in amplitude by random low-frequency oscillations; a delayed local oscillation derived from the modulated outgoing carrier is mixed with echoes received from a reflecting object so as to produce an output signal which varies in amplitude with the distance of the object and in frequency with the relative velocity thereof. In a preferred embodiment, either or both antenna systems have a pattern of radiation defined by two forwardly diverging coaxial cones centered on the flight path of the vehicle.

---

Our present invention relates to an airborne triggering system responsive to echoes of high-frequency electromagnetic waves which are reflected from a target as the latter is approached by a missile or other vehicle equipped with that system.

Such radar-type triggering systems have their principal utility in so-called proximity fuses used for the destruction of military targets, the signal produced by the triggering circuit serving to set off an explosive charge aboard the missile as the latter flies past the object to be attacked. It should be noted, however, that such systems can also be utilized for industrial or scientific purposes, e.g. by triggering a camera shutter or sending back a monitoring signal upon passing close to the designated object.

In commonly assigned application Ser. No. 514,187, filed Dec. 16, 1965, by us jointly with Georges Nard, now patent No. 3,332,077, there has been disclosed a system of this general type wherein the transmitted high-frequency energy is in the form of short equi-spaced pulses which are beamed in a direction substantially perpendicular to the flight path of the vehicle and are randomly modulated in phase. Upon the reception of similarly modulated echo pulses from a reflective target within a predetermined distance range, each echo pulse is compared with a delayed replica of an outgoing pulse previously transmitted, the delay equaling the transit time to and from the center of the selected distance range. Upon proper correlation of the respective pulse phases, which in a preferred case are either 0° or 180°, the two matching pulse trains give rise to an output voltage varying in amplitude in accordance with the changing distance between the vehicle and the target; this varying output, whose frequency is a measure of the Doppler shift experienced by the carrier wave of the pulses, is then passed through a filter serving as a velocity gate and, if of sufficient amplitude to clear a threshold device, triggers a detonation or other load to be actuated.

The aforedescribed system is highly effective under certain conditions, especially where the reflector of the vehicle is inclined at a relatively steep angle to the horizontal. As it passes a substantially stationary target, the angle of inclination results in a vehicle speed relative to ground which is substantially different from the relative radial velocity of vehicle and target so that echoes from the ground will not produce signals capable of passing the velocity gate and will not falsely trigger the load circuit. The system is, however, less reliable when mounted aboard missiles or other vehicles moving substantially horizontally above ground and intended to zero in on a target having no or only a very low ground speed.

It is, therefore, an important object of our present invention to provide an airborne triggering system of the general character set forth which can also be effectively used, with only a minimum probability of response to spurious echoes from the ground, under the circumstances last described.

Another object of this invention is to provide a system capable of being triggered by objects passing at close range, to the exclusion of more distant reflectors.

It is also an object of our invention to provide a system of the type referred to which operates with a minimum expenditure of energy and, therefore, with but small risk of detection by the target or its defenders when used aboard a missile to trigger a proximity fuse.

These objects are realized, pursuant to our present invention, by the provision of an airborne radar transmitting and receiving system generally similar to that of the aforementioned prior application, as described above, but with the principal difference that the outgoing phase-modulated pulses are replaced by a continuous carrier wave randomly modulated in amplitude, the frequencies of the modulating oscillations being low enough to define an extended range of correlation, e.g. a range of relative phase displacement within which a reflected carrier wave, when linearly superimposed upon a delayed local oscillation derived from the outgoing modulated carrier, will give rise to a fluctuating output signal of sufficient amplitude to clear a threshold device, the frequency of this output signal being again screened by a Doppler filter acting as a velocity gate.

Advantageously, in accordance with a more specific feature of this invention, the transmitter and/or the receiver aboard the vehicle comprises one or more antennas with a strongly directive pattern bounded by a pair of forwardly diverging coaxial cones centered on the flight path of the vehicle, thus limiting the area of response to a region just ahead of the vehicle; at certain minimum elevations above ground, this conical beam pattern will effectively illuminate a ground area just smaller than that required to reflect echoes of a magnitude sufficient to clear the range gate constituted by the threshold device so that the systems aboard a vehicle traveling at or above this critical elevation will not be triggered by ground echoes, independently of the ground speed of the vehicle.

The invention will be described in greater detail with reference to the accompanying drawing in which:

FIG. 12 is a set of graphs serving to explain the general mode of operation of our system.

Figure 1:
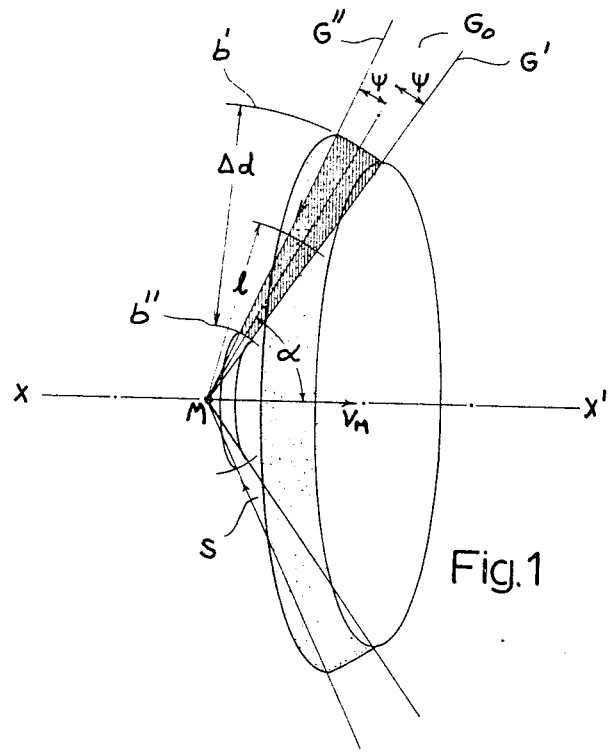
FIG. 1 is a diagrammatic view of the beam pattern of an array of receiving antennas aboard a missile equipped with a radar system according to the invention.

In FIG. 1 we have diagrammatically illustrated the missile M flying substantially horizontally above ground, along an axis X–X' at a speed $v_M$. It will be understood that the trajectory of missile M is not necessarily rectilinear and that the vector $v_M$ merely represents the instantaneous velocity tangent to its path. Missile M is equipped with a set of transmitting and receiving antennas comprising, as particularly illustrated in FIG. 9, a single transmitting aerial 305 in line with axis X–X' and a pair of receiving aerials 311 parallel to that axis and symmetrically disposed on opposite sides thereof. These aerials are so arranged that their outgoing and incoming beam patterns coincide within a space S bounded by two forwardly diverging frustoconical surfaces; their generatrices G' and G" include an angle $\Psi$ with the generatrices $G_0$ of a central cone of apex angle $2\alpha$. This forwardly diverging space S may be defined by the directive pattern of the transmitting and/or the receiving antenna system; in the present embodiment, as more fully described hereinafter in connection with FIGS. 9–11, the outgoing wave energy $W_t$ is transmitted in a double-cone pattern bisected by a plane perpendicular to axis X–X' whereas the receiving antennas have a sharply directive pattern bounded by the generatrices G', G" which may be assumed to define the 3db limits of its principal lobe.

The extent of the annularly frustoconical space S is determined by the power of resolution of the triggering systems aboard the missile described in detail hereinafter. This system, as will subsequently become apparent, has a high degree of correlation within a limited distance range within which the probability of triggering in response to reflected wave energy $W_r$ is close to unity, e.g. approximately 95%. Outside that range, whose radial extent has been designated $\Delta d$ in FIG. 1, the probability of triggering drops sharply, e.g. to a value as low as $3 \cdot 10^{-6}$ at a distance of 0.25 $\Delta d$ beyond the distal boundary b' of space S; the proximal boundary b" of that space may be as close as desired to the missile M.

Figure 2:
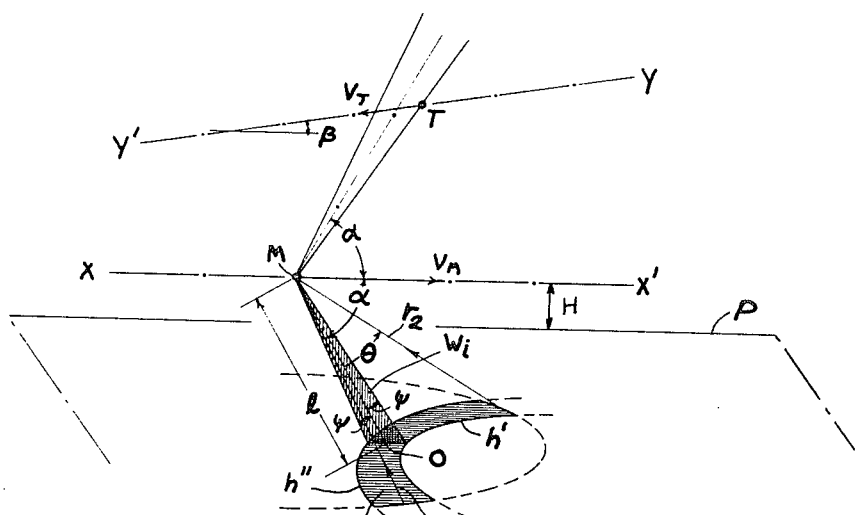
FIG. 2 is a diagrammatic view of the same beam pattern in section, illustrating the illuminated ground area and the relative motion of the missile and an approaching target.

In FIG. 2 we have shown the missile M flying at an elevation H above the ground plane P. The conical beam pattern S intersects this plane P along an area S' which is bounded by two hyperbola segments h', h" and whose center O is spaced from the missile M by a distance $l$. The limiting rays $r_1$, $r_2$ of the cone sector defining the area S' include with its centerline M–O an angle $\theta$ which, if O is assumed to lie at the midway within space S, satisfies the expression $$\cos \theta = \frac{l}{l + \Delta d/2}$$

since the length of rays $r_1$, $r_2 = l + \Delta d/2$ (see also FIG. 1). If $\theta$ is chosen small enough, the area S' thus defined may be insufficient to reflect echoes of such magnitude as to trigger the detonating system aboard the missile. In the situation illustrated in FIG. 1, in which $l \approx \Delta d/2$, the minimum elevation H necessary for the suppression of ground echoes will generally be such that the point O lies closer to the distal boundary b' of the beam pattern than to the central zone thereof.

FIG. 2 also shows a target T, such as an aircraft, moving at a velocity $v_T$ along an axis Y–Y' inclined at an angle $\beta$ with reference to axis X–X'. The relative velocity of the two objects M and T is therefore given by $$v_{MT} = v_M + v_T \cos \beta$$

and their relative radial velocity or Doppler speed $$v_D = v_{MT} \cos \alpha$$

at the instant when the target is intercepted by the central cone $G_0$ of space S. The corresponding Doppler frequency $f_D$ is given with $2 v_D/\lambda$ where $\lambda$ is the wavelength of the carrier wave.

Figure 3:
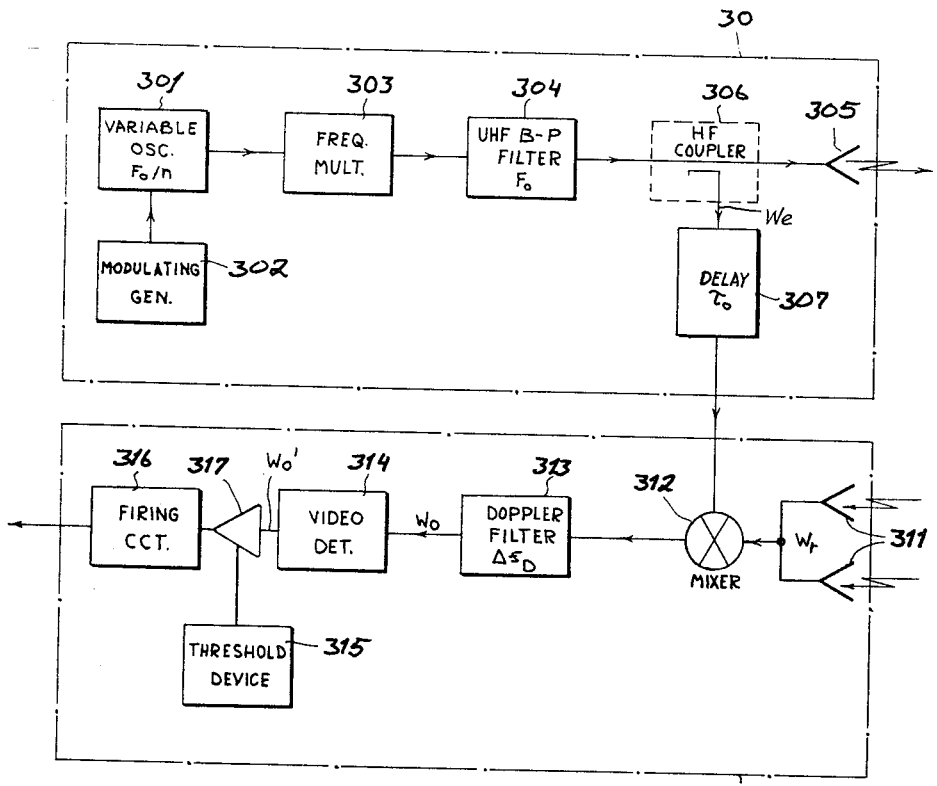
FIG. 3 is a circuit diagram of the radar system aboard the missile.

The triggering system shown in FIG. 3, divided into a transmitting section 30 and a receiving section 31, comprises a radar transmitter, represented by the aerial 305, and a radar receiver, represented by the aerials 311 adapted to operate with carrier frequencies up to, say, 10 gHz.($10^{10}$ c.p.s.). It comprises a variable oscillator 301 whose output, in the case illustrated, is the $n^{th}$ subharmonic $F_0/n$ of the carrier frequency $F_0$. This output is modulated in amplitude by a circuit 302 described in greater detail hereinafter with reference to FIG. 4; the output of modulator 302 is confined to a band of low frquencies B. A frequency multiplier 303 receives the modulated output of oscillator 301 and changes its frequency to the desired magnitude $F_0$ as selected by a bandpass filter 304. This filter works into a coupler 306 from which a local oscillation, corresponding to the modulated carrier $F_0$, is obtained before the carrier is fed to antenna 305; this local oscillation $W_l$ passes through a delay device 307, of delay time $\tau$; and is thereafter supplied to a mixer 312 in receiving section 31 which also obtains the incoming wave energy $W_r$ from antenna 311. The two waves $W_r$ and $W_l$, linearly superposed in mixer 312, produce a composite wave whose envelope constitutes an output signal $W_0$ of a frequency dependent upon the Doppler speed of the reflecting object. This envelope $W_0$, detected in a circuit 313 which includes a filter passing the desired band of Doppler frequencies, is next transmitted to a video detector 314 integrating it over a time $t_1$ commensurate with the expected illumination period of a target moving at a radial velocity within the predetermined range of Doppler speeds. The output $W_0'$ of detector 314 is then passed through an amplitude gate such as an amplifier 317 having a predetermined bias applied to it by a threshold device 315. The final signal, clearing the amplitude gate 315, 317, is applied to a firing circuit 316 to detonate an explosive charge aboard the missile M.

The operation of the radar system previously described above will be more clearly understood from a reference to FIG. 12 which shows in graph (a) the amplitude-modulated high-frequency carrier wave $W_r$ arriving at the receiving antenna 311. The local oscillation $W_l$, issuing from delay circuit 307, is shown in graph (b). If the reflecting object is substantially midway within the region of interception S shown in FIGS. 1 and 2, so that the transit time of the transmitted and received wave energy is $2l/c = \tau_0$, the low-frequency envelopes of waves $W_r$ and $W_l$ will be in phase while the phase relationship of their respective carriers will vary at a rate determined by the relative speed of the missile and its target. Thus the carriers will also be in phase at a time $t_1$ so that the sum of these carriers will be a composite carrier of large amplitude as illustrated in graph (c). At time $t_2$, the two carriers will have been relatively shifted by 180°, as indicated by the relative reversal of the contours in graphs (a) and (b), so that the amplitude of the composite carrier in graph (c) will be small. At time $t_3$, the cophasal relationship of the carriers has been restored, and so forth. Thus the composite carrier shown in graph (c) will have an envelope $W_0$ which, after detection in circuit 313, will be an alternating voltage of a frequency within the selected Doppler range and of an amplitude dependent upon the relative amplitudes of the two component carriers $W_r$ and $W_l$. If the amplitude of $W_r$ should differ greatly from that of local carrier $W_l$, envelope $W_o$ will be relatively flat; the same situation will exist if the two envelopes shown in graphs (a) and (b) are substantially out of phase with each other, e.g. by more than one quarter wavelength of the highest frequency in the output of modulator 302 which determines the bandwidth B. Thus, the interval $\Delta d/c$ which represents the transit time back and forth between the midpoint of space S and either of its boundaries $b'$ and $b''$, should be substantially less than the period $1/4B$ and, with the distance from M to $b'$ approximately equal to $\Delta d$, the length of a half-cycle $\frac{1}{2}B$ should be considerably greater than the transit time $2\ d/c$ to and from that remote boundary. When these conditions are satisfied, the output signal $W_o$ of circuit 313 as detected in circuit 314 will give rise to a voltage $W_o'$ of sufficient magnitude to pass the gate 317 and actuate the firing circuit 316.

The bandwidth B and the interval $t_i$ of coherent integration jointly determine the signal-to-noise ratio of our system whose noise level N is given by $$N = N_o \sqrt{Bt_i}$$

where $N_o$ is the noise at the center of the region of interception S. Thus, the rate of protection against spurious triggering signals is represented by the factor $Bt_i$.

Figure 4:
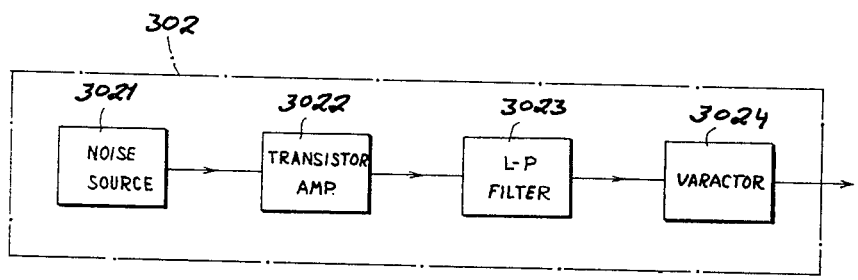
FIG. 4 is a more detailed diagram of a modulating circuit included in the system of FIG. 3.
Figure 5:
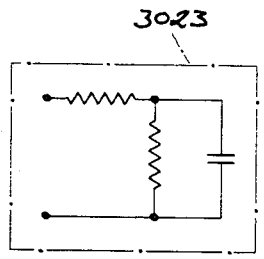
FIG. 5 is a detailed diagram of a low-pass filter also included in the system of FIG. 3.

The system shown in FIG. 3 may be constituted by highly compact solid-state and miniaturized circuit elements operable at low energy. Although all the components of the circuit are conventional, we shall describe hereinafter preferred forms of some of these devices. Thus, FIG. 4 illustrates the modulator 302 as comprising an electronic noise source 3021, which may be an overdriven transistor, working into a preferably transistorized amplifier 3022 whose output is delivered to a low-pass filter 3023 selecting the modulation band B. The low-frequency oscillations within this band B are then impressed upon a non-linear impedance element 3024, preferably a varactor, which also receives the carrier frequency from oscillator 301 (FIG. 3) to produce the modulated subharmonic $F_o/n$. Filter 3023 may be of the resistance-capacitance type, e.g. as illustrated in FIG. 5.

Figure 6:
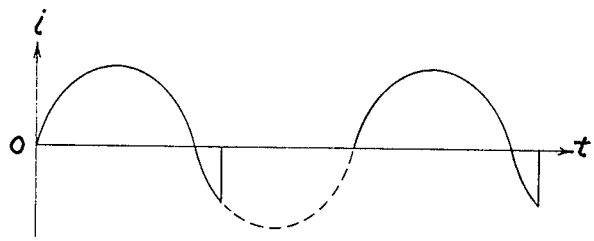
FIG. 6 is a graph showing the performance of an element of a frequency multiplier included in the system of FIG. 3.
Figure 7:
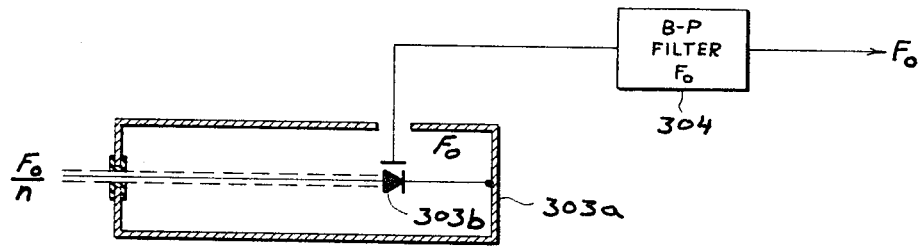
FIG. 7 is a more detailed diagrammatic view of the frequency multiplier incorporating the element referred to in connection with FIG. 6.

The frequency multiplier 303 may comprise a resonant cavity 303a tuned to the output frequency $F_o$ and containing a nonlinear impedance element 303b to which the input frequency $F_o/n$ is applied. Element 303b may be a crystal diode of, for example, the step-recovery type whose output current $i$ in response to an applied sinusoidal voltage has a steep flank in the negative half-cycle as illustrated in FIG. 6; this type of diode is characterized by a parabolic distribution of its impurities. Diodes of this or related character produce a spectrum of harmonics among which the frequency $F_o$ is selected by the tuned cavity 303a for delivery to the bandpass filter 304.

Figure 8:
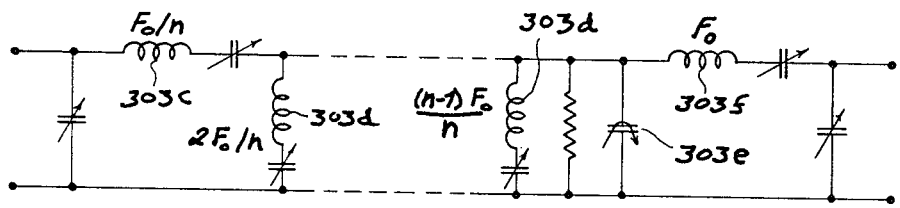
FIG. 8 is a more detailed circuit diagram of a modified frequency multiplier for the system of FIG. 3.

In FIG. 8 we have shown an alternate type of frequency multiplier with a series-resonant input circuit 303C tuned to the subharmonic $F_o/n$, a plurality of series-resonant shunt circuits 303d tuned to respective harmonics to be suppressed, a nonlinear impedance 303e preferably constituted by a varactor or several varactors in series, and a series-resonant output circuit 303f tuned to the desired frequency $F_o$. If $n=2$, elements 303d are of course omitted.

The coupler 306 and the mixer 312 may be low-impedance circuit elements of the type known as strip-line conductors, comprising a pair of flat outer conductors bracketing an inner conductor which is separated therefrom by a suitable dielectric. Other conventional devices, such as magic-T junctions, may also be used. Delay line 307 may be a coaxial cable of small diameter and suitable length which, for compactness, may be coiled around a supporting cylinder.

Figure 9:
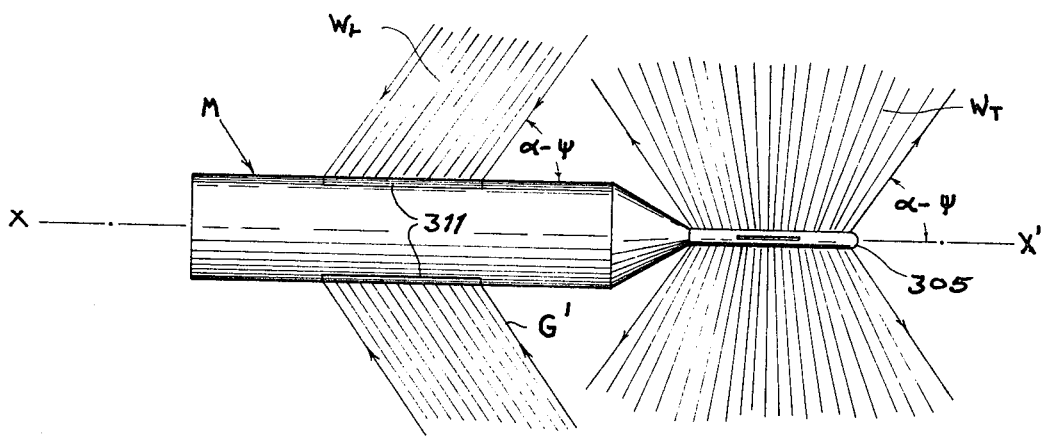
FIG. 9 is a side view of the missile with its transmitting and receiving antennas.
Figure 10:
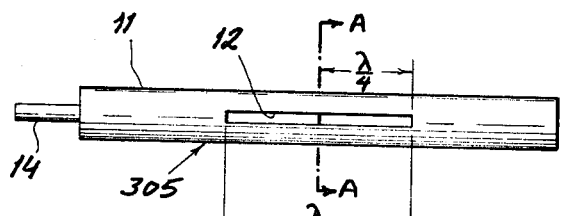
FIG. 10 is an enlarged side view of the transmitting antenna of the missile shown in FIG. 9.
Figures 10A, 10B:
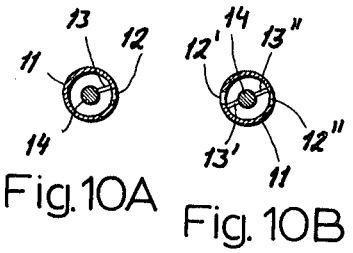
FIG. 10A is a cross-sectional view taken on the line A—A of FIG. 10.
FIG. 10B is a view similar to FIG. 10A, showing a modification of the antenna.

A suitable transmitting antenna 305 has been illustrated in FIGS. 10 and 10A. It comprises a coaxial line with an inner conductor 14 and an outer conductor 11, the latter being provided with at least one peripheral slot 12 extending longitudinally over half a wavelength of the carrier frequency. Near the midpoint of slot 12, conductors 11, 14 are short-circuited by a clip 13. With suitable dimensioning of this coaxial cable, the antenna will radiate substantially omnidirectionally in a plane transverse to its axis, its beam extending symmetrically on both sides of that plane (e.g. over an angle of 70°) as illustrated in FIG. 9.

If the diameter of the outer conductor 11 is selected for mechanical reasons to be substantially greater than $\lambda/10$ so that the aforedescribed peripheral field distribution no longer holds true, the number of slots 12 may be increased. Thus, we have shown in FIG. 10B a modified transmitting antenna whose outer conductor 11a is formed with two diametrically opposite slots 12', 12'', adjacent respective short-circuiting clips 13' and 13'', which couple the outer surface of the tubular conductor to its interior for omnidirectional radiation as heretofore described.

Figure 11:
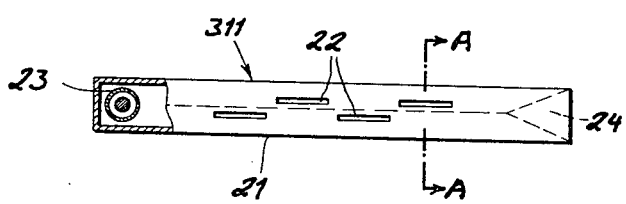
FIG. 11 is a view similar to FIG. 10, showing one of the receiving antennas of the missile of FIG. 9.
Figure 11A:
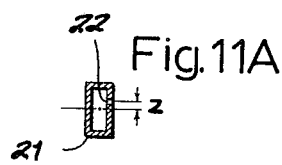
FIG. 11A is a cross-sectional view taken on the line A—A of FIG. 11.

Evidently, the limiting forward ray of the beam of outgoing wave energy $W_t$ in FIG. 9 should include the same angle $\alpha - \psi$ or a somewhat lesser angle with the missile axis X–X' as does the lower boundary ray G' of the beam of incoming wave energy $W_r$ received by the antenna 311. Each receiving antenna 311 may be in the form of a rectangular waveguide 21 as illustrated in FIGS. 11 and 11A, one major surface of the waveguide being provided with one or more longitudinal slots 22 of half a wavelength each. A coaxial input line 23 enters the waveguide at one end, its other end being provided with a termination 24 to form a matching impedance facilitating the propagation of wave energy along its axis; the velocity of propagation controls the angle $\alpha$ at the vertex of the conical beam. The offset $z$ of the slots 22 from the median plane of the guide determines the degree of coupling between its inner and outer surfaces. The greater the number of slots 22, the more sharply directive will be the beam pattern; for the same purpose there may be provided several axially spaced slots 12 in the transmitting antenna of FIG. 10.

It will thus be seen that our improved radar system, utilizing an emitter of a continuous carrier wave modulated by a high-entropy source of low-frequency electronic noise, is capable of effectively discriminating against spurious echoes from objects other than targets of certain minimum magnitude located in a predetermined volume S forwardly of the vehicle (e.g. within a few meters thereof) and moving at a speed within a selected Doppler range which may include zero ground speed. The choice of a suitable cone angle $\alpha$ affords measurable Doppler speeds even with targets moving along a path nearly parallel to that of the vehicle, e.g. as shown in FIG. 2. The firing circuit 316 may include a triggering element, such as a solid-state thyratron or controlled rectifier operable by a signal of several millijoules, responsive to an input of very low energy and, like the rest of the system, should be well shielded against parasitic signals from without.

Naturally, our invention is not limited to the specific circuitry described and illustrated but may be realized in modified form without departing from the spirit and scope of the appended claims.

We claim:

1. An airborne triggering system responsive to echoes of high-frequency electromagnetic waves reflected from a target, comprising aboard a vehicle:

a generator of a continuous high-frequency carrier wave;

circuit means coupled to said generator for modulating said carrier wave by random low-frequency oscillations;

first antenna means coupled to said generator for transmitting the modulated carrier wave over an outgoing radar beam;

second antenna means for receiving echoes of said carrier wave reflected from extraneous objects along lines having a predetermined orientation with reference to the flight path of said vehicle;

delay means coupled to said generator for deriving from said modulated carrier wave an identically modulated local oscillation bearing a predetermined phase relationship with the output of said generator;

linear mixer means coupled to said delay means and to said second antenna means for superimposing said local oscillation upon said echoes, thereby producing an output signal varying in amplitude with the distance of a reflecting object and in frequency with the velocity of said object relative to said vehicle;

and a load circuit connected to said mixer means for receiving said output signal therefrom, said load circuit including filter means for eliminating output signals due to reflecting objects with relative velocities beyond a predetermined speed range and threshold means for suppressing output signals due to reflecting objects at locations beyond a predetermined distance range.

2. A system as defined in claim 1 wherein said circuit means includes a low-pass filter for limiting said random oscillations to a band of frequencies with half-cycles greater than the transit time to and from the remote end of said distance range, said delay means having a delay period substantially equal to the transit time to and from the center of said distance range.

3. A system as defined in claim 2 wherein said circuit means further comprises an electronic noise source preceding said low-pass filter.

4. A system as defined in claim 2 wherein said circuit means further includes a varactor in the output of said low-pass filter.

5. A system as defined in claim 1 wherein at least one of said antenna means has a beam pattern bounded by two forwardly diverging coaxial cones centered on said flight path.

6. A system as defined in claim 5 wherein said second antenna means comprises at least one aerial in the form of a rectangular waveguide provided with at least one longitudinal slot extending over substantially half a wavelength of said carrier wave.

7. A system as defined in claim 6 wherein said waveguide is mounted substantially axially on said vehicle.

8. A system as defined in claim 5 wherein said first antenna means comprises a coaxial line mounted axially on said vehicle and having at least one longitudinal peripheral slot extending over substantially half a wavelength of said carrier wave.

9. A system as defined in claim 1 wherein said generator includes an oscillator followed by a frequency multiplier, said circuit means being connected to said oscillator ahead of said frequency multiplier.

10. A system as defined in claim 1 wherein said load circuit comprises detonator means responsive to said output signal for setting off an explosive charge aboard said vehicle.

References Cited

UNITED STATES PATENTS 3,113,305    12/1963    Trounson et al. _____ 343—7

BENJAMIN A. BORCHELT, *Primary Examiner.*

T. H. WEBB, *Assistant Examiner.*